(12) United States Patent
Arai

(10) Patent No.: US 7,224,672 B2
(45) Date of Patent: May 29, 2007

(54) XDSL MODEM

(75) Inventor: Yasuhiro Arai, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 907 days.

(21) Appl. No.: 09/964,900

(22) Filed: Sep. 27, 2001

(65) Prior Publication Data
US 2002/0150122 A1 Oct. 17, 2002

(30) Foreign Application Priority Data
Apr. 13, 2001 (JP) .............................. 2001-115864

(51) Int. Cl.
H04J 1/02 (2006.01)
H04L 12/26 (2006.01)
H04M 3/22 (2006.01)

(52) U.S. Cl. .................. 370/252; 370/493; 379/32.04; 375/222

(58) Field of Classification Search ................ 370/241, 370/465, 351, 352; 375/222, 227; 379/1.01, 379/1.04, 9.06, 22.03, 22.04, 22.08, 32.01, 379/32.04
See application file for complete search history.

(56) References Cited

U.S. PATENT DOCUMENTS

| | | | | |
|---|---|---|---|---|
| 4,766,594 A | * | 8/1988 | Ogawa et al. ............... | 714/716 |
| 6,385,203 B2 | * | 5/2002 | McHale et al. .............. | 370/401 |
| 6,430,219 B1 | * | 8/2002 | Zuranski et al. ............. | 375/231 |
| 6,477,238 B1 | * | 11/2002 | Schneider et al. ........ | 379/22.04 |
| 6,574,308 B1 | * | 6/2003 | Macdonald et al. ........ | 379/1.04 |
| 6,633,545 B1 | * | 10/2003 | Milbrandt .................... | 370/252 |
| 6,744,811 B1 | * | 6/2004 | Kantschuk .................. | 375/222 |
| 6,839,383 B1 | * | 1/2005 | Karnes ....................... | 375/222 |
| 6,856,683 B1 | * | 2/2005 | Murphy et al. ......... | 379/390.01 |
| 6,925,090 B2 | * | 8/2005 | Inada et al. ................. | 370/421 |
| 7,006,445 B1 | * | 2/2006 | Cole et al. .................. | 370/247 |

FOREIGN PATENT DOCUMENTS

| | | |
|---|---|---|
| JP | 06-261141 | 9/1994 |
| JP | 06-334774 | 12/1994 |
| WO | WO 0044195 A1 * | 7/2000 |

* cited by examiner

Primary Examiner—Alpus H. Hsu
Assistant Examiner—Clemence Han
(74) Attorney, Agent, or Firm—Katten Muchin Rosenman LLP

(57) ABSTRACT

A reception result of an analog signal transmitted from a local switch to a subscriber line, or a voltage difference corresponding to a line current is analyzed, and a transmission characteristic in the subscriber line is evaluated based on an analyzing result. The transmission characteristic is sent to a network by use of a function of an analog transmitting unit. Noises having power of a predetermined threshold value or more are detected from a data signal input to a digital transmitting unit, and a periodicity of the noises is examined, whereby influences of the cyclic noises are evaluated, and an examination result is sent to the network by use of the function of the analog transmitting unit. As a result, provided is an xDSL modem capable of automatically collecting various characteristics of the subscriber line connected thereto prior to a start of a provision of a broadband communication service.

4 Claims, 10 Drawing Sheets

XDSL MODEM

BACKGROUND OF THE INVENTION

1. Field of the Invention

The present invention relates to an x digital subscriber line (hereinafter referred to as an xDSL) modem which comprises a line characteristic estimating function for estimating characteristics of a telephone line connected thereto, when broadband communication services using an xDSL technology are provided.

The xDSL technology is capable of transmitting data of several mega bits per one second at a high speed by use of a metal wire such as an existing telephone wire, and hence the xDSL technology has lately attracted a considerable attention as a communication system in stead of an analog modem. The xDSL technology includes HDSL (high bit rate DSL) technology, SDSL (single line DSL) technology, RADSL (rate adaptive DSL) technology, VSDL (very high bit rate DSL) technology, and ADSL (asymmetric DSL) technology; and among these technologies, the ADSL technology is particularly attractive because its asymmetric transmission capacity is suitable for an Internet access and standardization of technical specifications is advanced. Popularization of a broadband communication service using the ADSL modem has been expected.

2. Description of the Related Art

FIG. 10 shows a constitution example of a communication system which provides broadband communication services by use of an ADSL technology.

Referring to FIG. 10, an ADSL modem 411 and a telephone set 412 installed in a subscriber's home are connected to a subscriber line through a splitter 413, respectively. The subscriber line is connected to a splitter 401 installed in a central office, and signals that have arrived at the central office through the subscriber line are divided by the splitter 401 into a signal of a frequency band used in a plain old telephone system (POTS) and a signal of a frequency band used in the xDSL technology. Analog signals for POTS are delivered to a local switch 402.

Furthermore, in the central office shown in FIG. 10, an ADSL modem 403 is installed by a provider providing broadband communication services by the ADSL (hereinafter simply referred to as broadband communication services). The ADSL modem 403 faces the ADSL modem on the subscriber side. The modulated-analog signal of the frequency band separated by the above-described splitter 401 is converted to a digital data signal by the ADSL modem 403, and thereafter is delivered to a router 404 (or an ATM switching system). Then, the digital signal data is delivered from the router 404 to a server of the provider through a predetermined data channel. Moreover, the digital data signal sent to a user from the server of the provider is delivered to the ADSL modem 403 from the router 404 through a reversed path in the data channel, and is converted to a modulated-analog signal by the ADSL modem 403. The modulated-analog signal is then sent out to the subscriber line through the splitter 401.

In the conventional broadband communication service, when a contract is made between a subscriber of a telephone system provided by NTT (Nippon Telegraph and Telephone company) and a provider providing a broadband communication service, a request for a construction is first issued to NTT from the provider. Subsequently, a work in which a connection of a subscriber line of a customer with the local switch 402 provided in the plain old telephone system (POTS) is changed to that with the ADSL modem 403 is performed in a central office by NTT. Thereafter, the provider sets up an ADSL modem exclusively used for the broadband communication services provided by the provider in a subscriber's home, and then performs a connection check of the ADSL modem.

As a result of this connection check, when it is proved that a good service quality is acquired in the subscriber line connected to the subscriber's home, the subscriber can accept the provision of the broadband communication service by use of the ADSL modem.

On the contrary, when it is proved that a predetermined service quality cannot be acquired in the subscriber line connected to the subscriber's home, on the subscriber line a worker sent from the provider performs an operation for measuring characteristics of the subscriber line in order to investigate causes leading to deterioration of the service quality.

Generally, as the principal cause which deteriorates the service quality in the ADSL modem, assigned are transmission loss in proportion to a line length of the subscriber line between the subscriber's home and the central office, and cyclic noises accompanied by provision of time compression multiplexing-ISDN services in Japan. Accordingly, by measuring the transmission loss and the existence of the cyclic noises on the subscriber line and an intensity of the cyclic noises, it is possible to assign the cause of the deterioration of the service quality. Depending on the assigned cause and a degree thereof, it can be decided whether or not the provision of the broadband communication services is possible, and a necessary countermeasure can be decided if the provision of the broadband communication services is possible.

When, based on the measurement results of the above-described line characteristics, it is decided that the provision of the broadband communication services is possible, a necessary countermeasure is taken, which is performed, for example, in such a manner that the provider makes a request to NTT for changing a connection of the subscriber line connected to the subscriber's home. After the service quality required for the services is secured, the provision of the broadband communication services is begun.

Contrary to this, the service quality cannot sometimes be expected to be improved even by changing the connection of the subscriber line. For example, in the case where the subscriber line to which the service is to be provided and a subscriber line which is producing a crosstalk causing the frequency noises are located very closely to each other, particularly the case where these subscriber lines constitute the same quad comes under the above-described situation.

In such a case, the provider consults with the customer, and decides whether to provide services with limited transmission capacity or to abandon the provision of the broadband communication service itself.

As a technology for achieving coexistence of ADSL and ISDN, for example, there have been one used by applying Annex. C to G. lite and G. dmt that are international standard specs by ITU-T. Concerning G. lite and G. dmt, Annex. C respectively prescribes a spec that adjusts a transmission rate by ADSL so as to synchronize with clocks of ISDN having 400 Hz. In Annex. C, two kinds of modes are prescribed. One is a DBM mode that makes the transmission rate low during the period when a near-end crosstalk power is large; and the other is a FBM mode that performs a transmission by using only the period when the near-end crosstalk power is small. In any case, since the transmission capacity during the period when the near-end crosstalk power is large is drastically restricted, a decrease in the transmission capacity as a whole is inevitable. However, interference by ISDN can be suppressed to the minimum.

As described above, in the conventional procedures in which the broadband communication service is set up, it is unclear whether or not the service quality in the subscriber line of the customer satisfies the required conditions for providing the broadband communication services, until the ADSL modem is installed in the customer's home and the connection check of the ADSL modem is performed. Moreover, even if the causes deteriorating the service quality are assigned by performing the work for measuring the line characteristics for the subscriber line, it is not always possible to remove the causes. Specifically, there is a possibility that the provider does not come to provide the service in spite of costs and man-hours spent until then.

Recently, a case is observed, in which the provider send the ADSL modem to the customer, and entrusts the work for setting up the ADSL modem and the work of the connection test for the ADSL modem, thus attempting to decrease man-hours concerning the set-up work. However, also in this case, when the predetermined level of service quality cannot be acquired by the subscriber line of the customer, as a matter of course, the provider must send the worker to allow the worker to measure the line characteristics. Accordingly, the provider pays considerable costs and performs the considerable number of the working steps.

As described above, in the conventional broadband communication services, since no countermeasure to previously obtain various characteristics of the subscriber line used for services to be contracted, a risk that the provider must bear for setting up the broadband communication service is very serious compared to an income earned by a service contract. This has been a large hindrance from the viewpoint of propagation of the broadband communication service using the xDSL technology.

SUMMARY OF THE INVENTION

The object of the present invention is to provide an xDSL modem capable of automatically collecting characteristics of a subscriber line connected thereto prior to a start of a broadband communication service.

Another object of the present invention is to make it possible to precisely obtain a line length between a customer premises equipment and a local switch, with a control unit set up by a provider, by collecting a transmission loss concerning an analog signal as a part of transmission characteristics of a subscriber line connected to an xDSL modem.

Still another object of the present invention is to provide a key barometer for precisely estimating a line length of a subscriber line between a local switch and an xDSL modem of a customer, and deciding whether or not provision of a broadband communication service by use of an xDSL system is possible.

Still another object of the present invention is to make it possible to autonomously measure, by a function equipped in an xDSL modem, a transmission loss concerning an analog signal on a subscriber line connected to the xDSL modem. Thus, since the line length of the subscriber line can be estimated, it is no longer necessary to send workers from the provider to measure line length, and a risk that the provider had in setting up services can be drastically reduced.

A still further object of the present invention is to make it possible to estimate influences on a service quality caused by a near-end crosstalk from an ISDN line.

A still further object of the present invention is to make it unnecessary for a provider to send a maintenance worker for a measuring work, by collecting beforehand information concerning a line length of a subscriber line which is a very important barometer in estimating service quality of a broadband communication service by a xDSL system as well as concerning interference from an ISDN line near the subscriber line, and to drastically reduce risks that the provider had in setting up the broadband communication service. By this, the spread of the broadband communication service is strongly promoted.

The foregoing object of the present invention is achieved in such a manner that an evaluating unit evaluates a transmission characteristic of a subscriber line based on a receipt result of a signal transmitted from a local switch onto the subscriber line, and that a reporting unit sends out the obtained transmission characteristic to a network by use of a function of an analog transmitting unit.

In such an xDSL modem, prior to a start of the provision of the broadband communication service by use of the xDSL system, it is possible to automatically measure the transmission loss concerning the signal as the transmission characteristic of the subscriber line connected to the xDSL modem and to transmit the measurement result to the network, for example, by measuring a reception level of a signal transmitted to the subscriber line by the local switch.

Furthermore, the foregoing object of the present invention is achieved in such a manner that in the evaluating unit provided in the xDSL modem, a requiring unit sends out a predetermined requiring signal to the network through the analog transmitting unit, and an analyzing unit analyzes a reception result of the analog signal returned from the local switch in response to this requiring signal. Accordingly, an evaluation barometer indicating the transmission characteristic of the subscriber line is determined.

In such an xDSL modem, the line length of the subscriber line between the local switch and the xDSL modem can be precisely estimated by evaluating the transmission loss of the analog signal transmitted by the local switch in the subscriber line.

Furthermore, the foregoing object of the present invention is achieved in such a manner that in the analyzing unit provided in the xDSL modem, a control signal level measuring unit measures a reception level of a ringing signal transmitted from the local switch onto the subscriber line or of a secondary dial tone, and a signal loss calculating unit calculates the transmission loss of the analog signal on the subscriber line based on the reception level.

In such an xDSL modem, since the transmission loss of the analog signal on the subscriber line strictly stipulated according to a spec of the local switch is evaluated, the line length of the subscriber line between the local switch and the xDSL modem can be precisely estimated.

Furthermore, the foregoing object of the present invention is achieved in such a manner that in the analyzing unit provided in the xDSL modem, a speech signal level measuring unit measures a reception level of a modulated-analog signal transmitted onto the subscriber line from the local switch, and the signal loss calculating unit calculates a transmission loss of the modulated-analog signal on the subscriber line based on this reception level.

Being able to measure transmission loss over a wide frequency band is very effective in evaluating a service quality that can be expected on a line connected to the xDSL modem.

The foregoing object of the present invention is achieved in such a manner that in the evaluating unit provided in the xDSL modem, a current/voltage measuring unit measures a line current or a potential difference between twisted-pair cables caused by this line current, and a current loss calculating unit calculates the transmission loss on the subscriber line based on the obtained current value or the obtained voltage value.

Prior to a start of provision of the broadband communication service by the xDSL system, such an xDSL modem is capable of automatically measuring a transmission loss of an analog signal as a transmission characteristic of the subscriber line connected to the xDSL modem by measuring the line current or the voltage between the twisted-pair cables by use of only a function provided therein.

Furthermore, the foregoing object is achieved in such a manner that in the evaluating unit provided in the xDSL modem, a noise detecting unit detects noises having a power equal to a predetermined threshold value or more in a data signal which is separated from the analog signal by the splitter and input to the digital transmitting unit, and a periodicity examining unit examines a periodicity of the detected noises.

Prior to a start of provision of the broadband communication service by the xDSL system, in such an xDSL modem, the intensities of the noises entered into a metal wire and the periodicity thereof are automatically evaluated as the transmission characteristic of the subscriber line, whereby influences of near-end crosstalk from the ISDN line on service quality can be estimated.

BRIEF DESCRIPTION OF THE DRAWINGS

The nature, principle, and utility of the invention will become more apparent from the following detailed description when read in conjunction with the accompanying drawings in which like parts are designated by identical reference numbers, in which.

DESCRIPTION OF THE PREFERRED EMBODIMENTS

A principle of an xDSL modem according to the present invention will be described.

Figure 1:
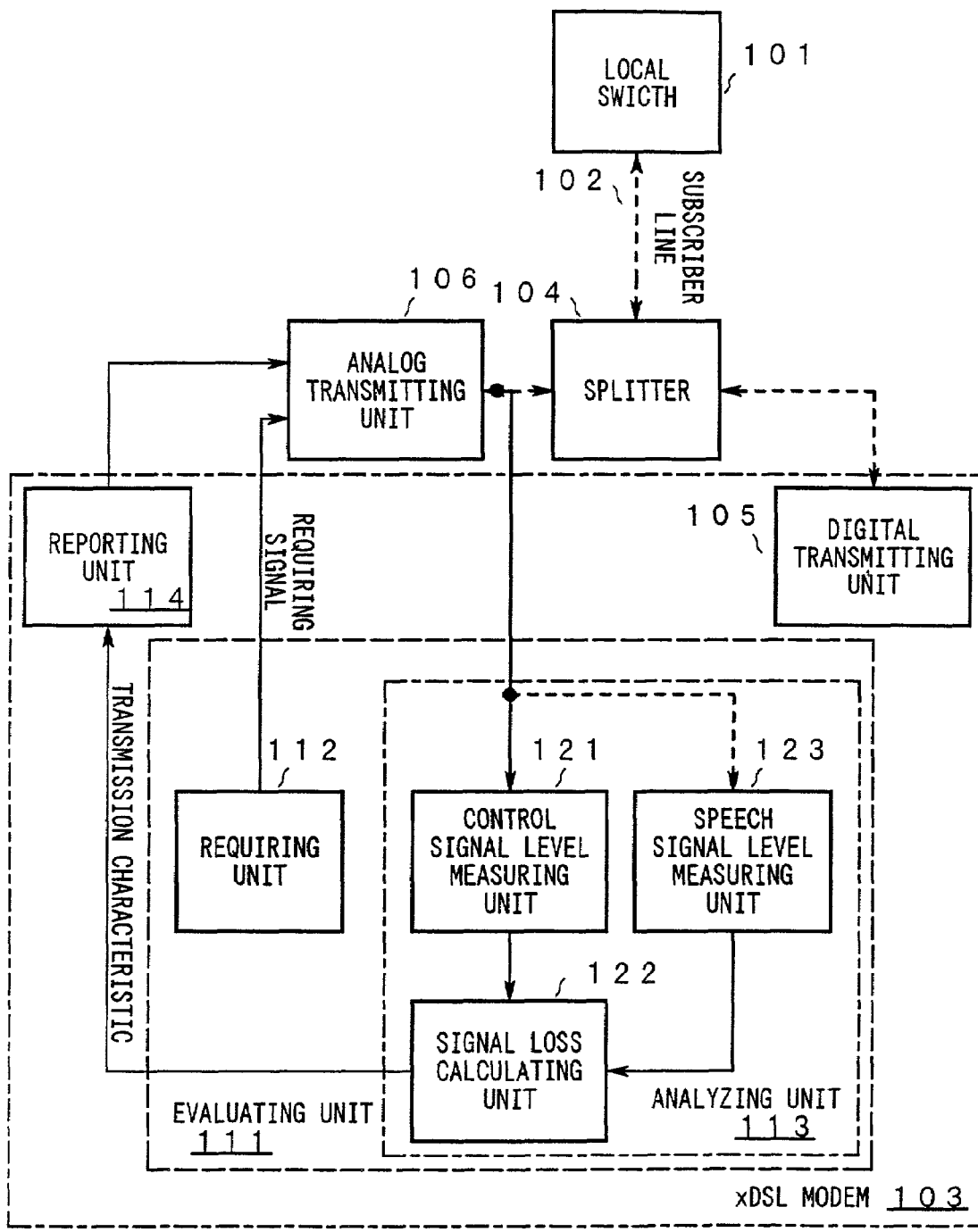
FIG. 1 shows a principle of first to fourth xDSL modems according to the present invention.

FIG. 1 shows a principle of first to fourth xDSL modems according to the present invention.

The first xDSL modem shown in FIG. 1 comprises a digital transmitting unit 105, an evaluating unit 111, and the reporting unit 114.

A principle of the first xDSL modem according to the present invention is as follows.

In the xDSL modem used for a digital communication through a subscriber line 102 connecting a local switch 101 and a customer premises equipment, the xDSL modem comprising a digital transmitting unit 105 which performs the digital communication using a data signal separated from a speech signal and an analog control signal by a splitter 104, which are used for a telephone communication by use of an analog transmitting unit 106, the evaluating unit 111 evaluates a transmission characteristic of the subscriber line 102 based on a reception result concerning a signal transmitted from the local switch through the subscriber line 102. The reporting unit 114 sends out the transmission characteristic obtained by the evaluating unit 111 to a network through the analog transmitting unit 106.

An operation of the first xDSL modem having the above-described constitution is as follows.

Based on the reception result of the signal transmitted onto the subscriber line 102 by the local switch 101, the evaluating unit 111 provided in the xDSL modem 103 automatically measures the transmission characteristic of the subscriber line 102 prior to a start of a provision of a broadband communication service. Furthermore, the reporting unit 114 sends out the measurement result to the network. In such a manner, the transmission characteristic sent out to the network by the reporting unit 114 can be collected by a provider. Thus, the provider can know the transmission characteristic of the subscriber line, to which a service is to be offered, prior to a start of the provision of the service. Accordingly, before a start of a management for the broadband communication service, the provider can examine for individual customers whether or not the broadband communication service can be offered and a range of a service that can be offered to the customer.

In FIG. 1, a second xDSL modem comprises a requiring unit 1112 and an analyzing unit 113 in the evaluating unit 111 which is provided in the foregoing first xDSL modem.

A principle of the second xDSL modem according to the present invention is as follows.

In the evaluating unit 111, the requiring unit 112 sends out a predetermined requiring signal to the network through the analog transmitting unit 106 prior to the start of the provision of the broadband communication service. Corresponding to a response signal returned, by the provider offering the broadband communication service, to the xDSL modem in response to the requiring signal, the analyzing unit 113 analyzes a reception result of an analog signal which is generated by the local switch 101 directly connected to the xDSL modem and transmitted through the subscriber line 102 thereto, and obtains an evaluation barometer indicating the transmission characteristic of the subscriber line 102. An operation of the second xDSL modem having the above-described constitution is as follows.

In the second xDSL modem, the requiring unit 112 sends out a requiring signal to the provider by the POTS, just as an analog signal used for a telephone communication is sent out, and obtains an evaluation barometer indicating the transmission characteristic of the subscriber line, based on the reception result of the analog signal transmitted by the local switch 101 in response to the requiring signal. Here, the line length of the subscriber line 102 connecting the local switch 101 and the xDSL modem 103 can be precisely estimated by making effective use of the fact that a characteristic of the analog signal transmitted from the local switch 101 onto the subscriber line is strictly prescribed by a spec of the local switch 101 and the fact that of a transmission line used generally as a subscriber line, a relation between the line length and an attenuation rate of the analog signal is known.

Furthermore, a third xDSL modem shown in FIG. 1 is constituted by comprising a control signal level measuring unit 121 and a signal loss calculating unit 122 in the analyzing unit 113 of the foregoing second xDSL modem.

A principle of the third xDSL modem according to the present invention is as follows.

In the analyzing unit 113, the control signal level measuring unit 121 measures a reception level of a secondary dial tone or a ringing signal transmitted from the local switch 101. The signal loss calculating unit 122 calculates a transmission loss by the subscriber line between the local switch 101 and the customer premises equipment based on the reception level, and outputs the transmission loss as a barometer for evaluating a transmission characteristic of the subscriber line.

An operation of the third xDSL modem having the above-described constitution is as follows.

When a ringing signal or a secondary dial tone signal is sent out from the local switch 101 onto the subscriber line 102 in response to a requiring signal sent out from the requiring unit 112, the control signal level measuring unit 121 measures a reception level of either the ringing signal or the secondary dial tone signal, and delivers a measurement result to the signal loss calculating unit 122. Based on the measurement result, the signal loss calculating unit 122 calculates the transmission loss, of the foregoing signals, by the subscriber line 102, and outputs the transmission loss as the evaluation barometer for indicating the transmission characteristic of the subscriber line 102.

A fourth xDSL modem shown in FIG. 1 is constituted by comprising a speech signal level measuring unit 123 and the signal loss calculating unit 122 in the analyzing unit 113 provided in the foregoing second xDSL modem.

A principle of the fourth xDSL modem according to the present invention is as follows.

In the analyzing unit 113, the speech signal level measuring unit 123 measures a reception level of a modulated-analog signal transmitted from the local switch 101 in response to a predetermined modulated signal in conformity with the regulation of the recommendation V.90 by ITU-T. The signal loss calculating unit 122 calculates a transmission loss of the modulated-analog signal, based on the reception level, by the subscriber line 102 between the local switch 101 and the xDSL modem 103, and outputs the transmission loss as a barometer for evaluating a line characteristic of the subscriber line 102.

An operation of the fourth xDSL modem having the above-described constitution is as follows.

When the modulated-analog signal of 300 Hz to 3.4 kHz, which is obtained by converting the modulated signal in conformity to the regulation of the recommendation V.90 (hereinafter referred to as a digital modulated signal) by use of the local switch 101, arrives at the xDSL modem 103 through the subscriber line 102 in response to the requiring signal sent out from the requiring unit 112, the speech signal level measuring unit 123 measures a reception level and provides the reception level concerning the modulated-analog signal to the signal loss calculating unit 122. Thus, the signal loss calculating unit 122 determines the transmission loss of a signal on the subscriber line 102, which has a frequency band (300 Hz to 3.4 kHz) in the foregoing modulated-analog signal.

Figure 2:
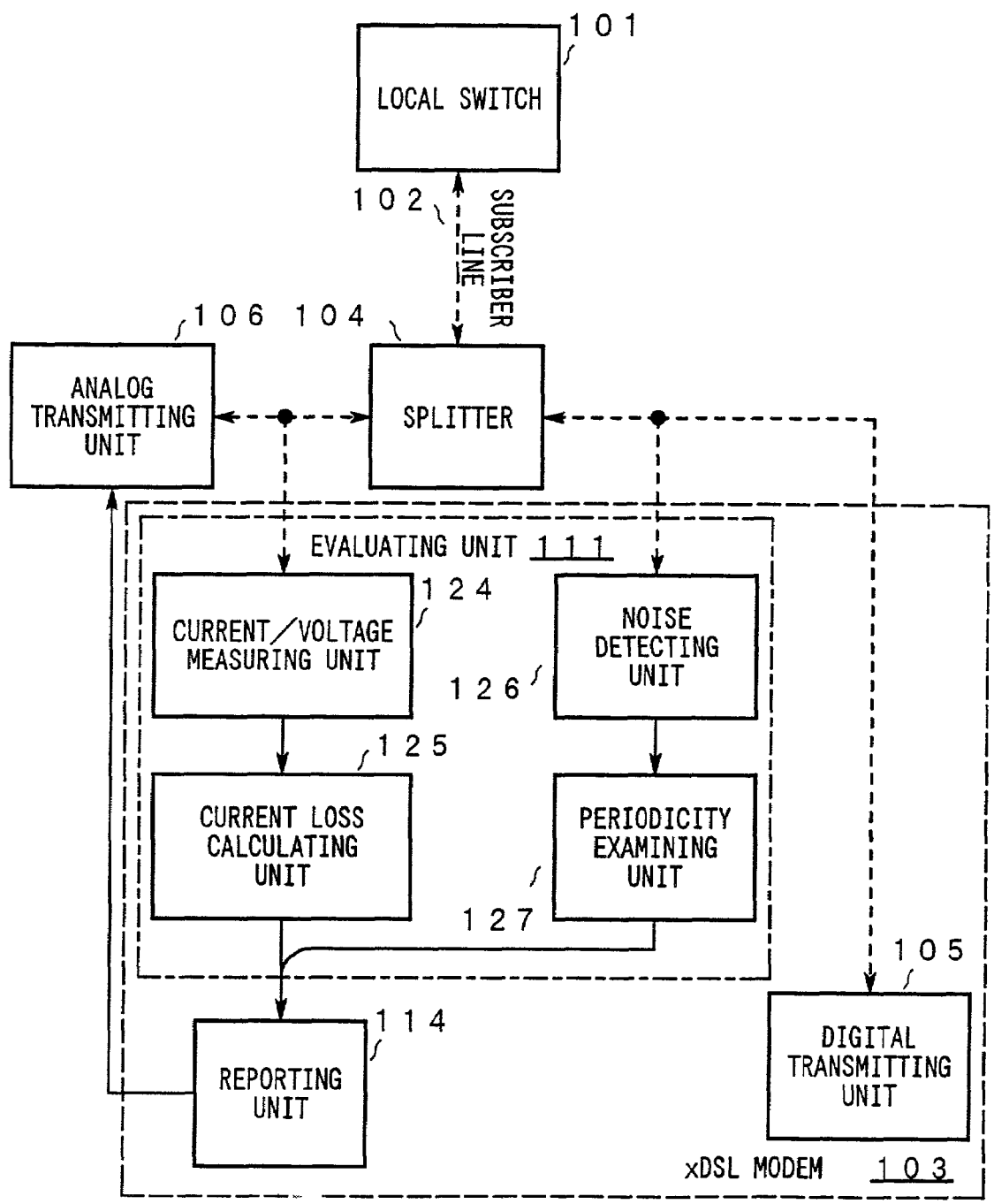
FIG. 2 shows a principle of fifth and sixth xDSL modems according to the present invention.

In FIG. 2, a principle of fifth and sixth xDSL modems according to the present invention is shown. The fifth xDSL modem shown in FIG. 2 is constituted by comprising a current/voltage measuring unit 124 and a current loss calculating unit 125 in the evaluating unit 111 provided in the forgoing first xDSL modem.

A principle of the fifth xDSL modem according to the present invention is as follows.

In the evaluating unit 111, the current/voltage measuring unit 124 measures a local loop current flowing on the subscriber line 102 between the local switch 101 and the xDSL modem 103 in an off-hook state, or alternatively the current/voltage measuring unit 124 measures a voltage between two copper wires forming the subscriber line 102 in a state where the local loop current flows on the subscriber line 102. The current loss calculating unit 125 calculates a transmission loss by the subscriber line 102 based on the current value or the voltage value which were determined, and outputs the transmission loss as a barometer for evaluating a transmission characteristic of the subscriber line 102.

An operation of the fifth xDSL modem having the above-described constitution is as follows.

Prior to a start of the provision of the broadband communication service, the current/voltage measuring unit 124 produces the off-hook state, and measures the local loop current or a potential difference between twisted-pair cables, which is generated by the local loop current. Then, the current/voltage measuring unit 124 delivers the measurement result to the current loss calculating unit 125. The current loss calculating unit 125 calculates a loss concerning a DC current as a barometer indicating a transmission loss on the subscriber line 102, based on the local loop current or the potential difference determined by the measurement.

The sixth xDSL modem shown in FIG. 2 is constituted by comprising a noise detecting unit 126 and a periodicity examining unit 127 in the evaluating unit 111 provided in the foregoing first xDSL modem.

A principle of the sixth xDSL modem according to the present invention is as follows.

In the evaluating unit 111, from a signal which is separated from an analog signal by the splitter 104 and is input to the digital transmitting unit 105 provided in the xDSL modem 103, the noise detecting unit 126 detects noises having a reception level equal to a threshold value or more, prior to a start of the provision of the broadband communication service. The periodicity examining unit 127 examines a periodicity of the noises detected by the noise detecting unit 126, and outputs the obtained examination result as a barometer for evaluating the transmission characteristic of the subscriber line 102.

An operation of the sixth xDSL modem having the above-described constitution is as follows.

Prior to a start of the provision of the broadband communication service, the noise-detecting unit 126 detects the noises from the signal input to the digital transmitting unit 105 through the splitter 104. The periodicity examining unit 127 examines the detected noises whether or not detection timings have a periodicity equivalent to a periodicity of a predetermined synchronous signal, whereby an evaluation barometer of a degree of interference from the ISDN line, which is one of factors having adverse influences on a data communication by use of the xDSL system, is obtained.

Embodiments of the present invention will be described in detail with reference to the accompanying drawings below.

Figure 3:
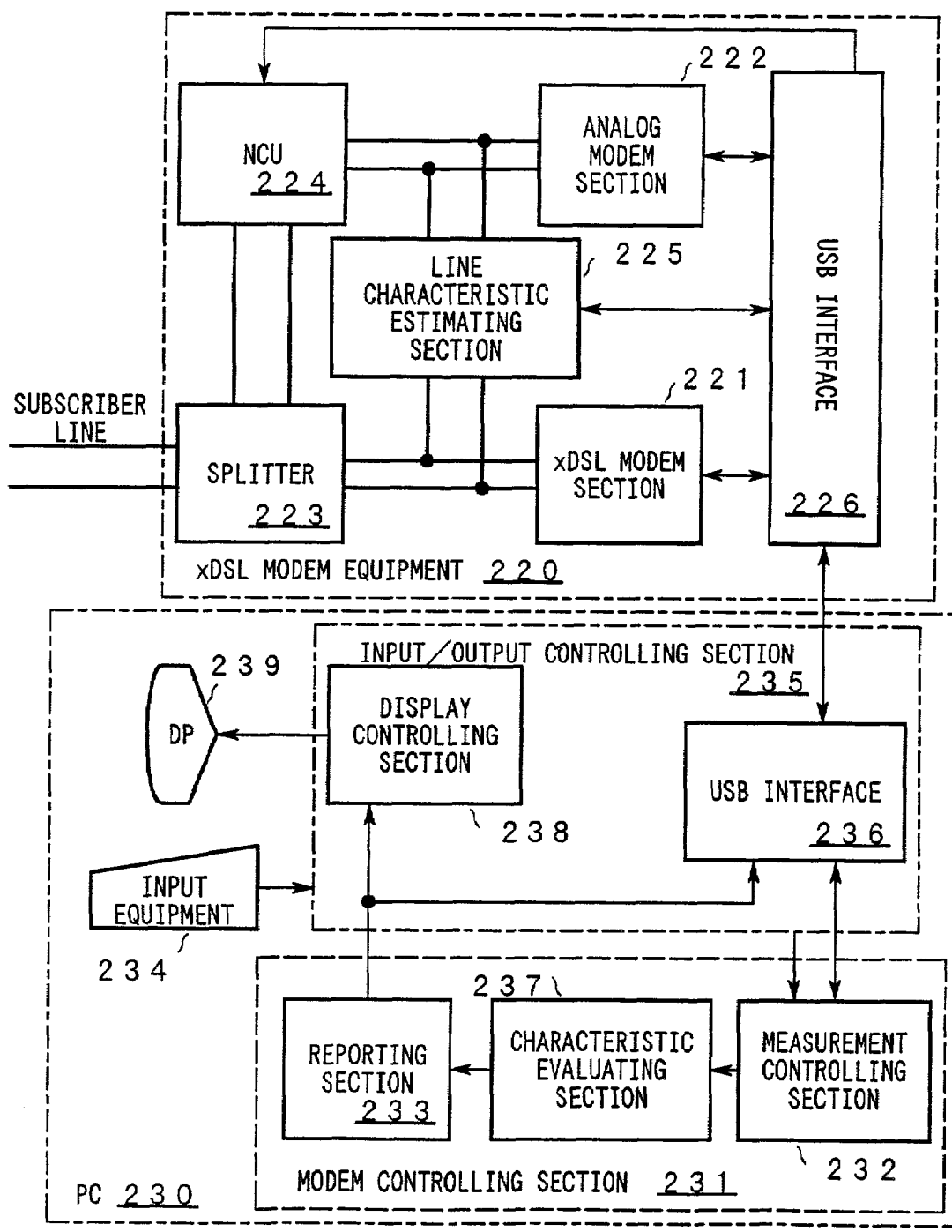
FIG. 3 is a block diagram showing a first embodiment of an xDSL modem according to the present invention.

In FIG. 3, a first embodiment of an xDSL modem equipment of the present invention is shown.

The xDSL modem equipment 220 shown in FIG. 3 incorporates a splitter 223 and an analog modem section 222. In the xDSL modem equipment 220, the splitter 223 separates signals received through the subscriber line into a digital data signal and a standard voice signal which is exchanged in a telephone system. The splitter 223 delivers the data signal to an xDSL modem section 221 and the standard voice signal to the analog modem section 222 through a network control unit (NCU) 224. Moreover, the standard voice signal sent out to the line through the network control unit 224 by the analog modem section 222 and the data signal sent out to the line by the xDSL modem section 221 are mixed by the splitter 223, and sent out to the subscriber line. In the xDSL modem equipment 220, the xDSL modem section 221 and the analog modem section 222 are connected, for example, to a personal computer (PC) so as to interpose a USB interface 226 therebetween.

Furthermore, in the xDSL modem equipment 220 shown in FIG. 3, a line characteristic estimating section 225 monitors both of the standard voice signal and the digital data signal which are separated and output by the splitter 223. The line characteristic estimating section 225 plays a role to perform a measuring process on a designated standard voice signal and a designated digital data signal based on an instruction received from the personal computer 230 through the USB interface 226 and to inform the obtained measurement result to the personal computer 230 through the USB interface 226.

On the other hand, in the personal computer 230 shown in FIG. 3, a modem controlling section 231 is, for example, realized by executing a special-purpose program set up in installing of the xDSL modem equipment 220 in the personal computer 230 by use of a central processing unit (CPU) (not shown) provided in the personal computer 230.

When an instruction to start a measurement processing for the line characteristic is input to an input/output controlling section 235 through an input equipment 234, a measurement controlling section 232 provided in the modem controlling section 231 receives this instruction through the input/output controlling section 235. In response to this instruction, the measurement controlling section 232 sends out an instruction to measure the line characteristic to the xDSL modem equipment 220 through a USB interface 236 in accordance with procedures to be described later. Furthermore, the measurement controlling section 232 collects, through the USB interface 236, the results measured by the line characteristic estimating section 225 provided in the xDSL modem equipment 220. Based on the measurement results collected by the measurement controlling section 232, a characteristic evaluating section 237 calculates a characteristic value of the line necessary for deciding feasibility of the communication service using the xDSL technology, and delivers the obtained characteristic value to a reporting section 233. The reporting section 233 makes a reporting message including the characteristic value obtained by the characteristic evaluating section 237. The reporting section 233 delivers the reporting message through the USB interface 236 to the analog modem section 222 provided in the xDSL modem equipment 220, and requests the analog modem section 222 to transmit the reporting message. Moreover, the reporting section 233 makes display data for displaying the above-described reporting message, and asks a display controlling section 238 to display the reporting message. Then, the reporting message may be provided to the user through a display device (DP) 239.

In the descriptions described below, the USB interface 226 provided in the xDSL modem equipment 220 and the USB interface 236 provided in the personal computer 230 are simply referred to as a USB interface.

Figure 4:
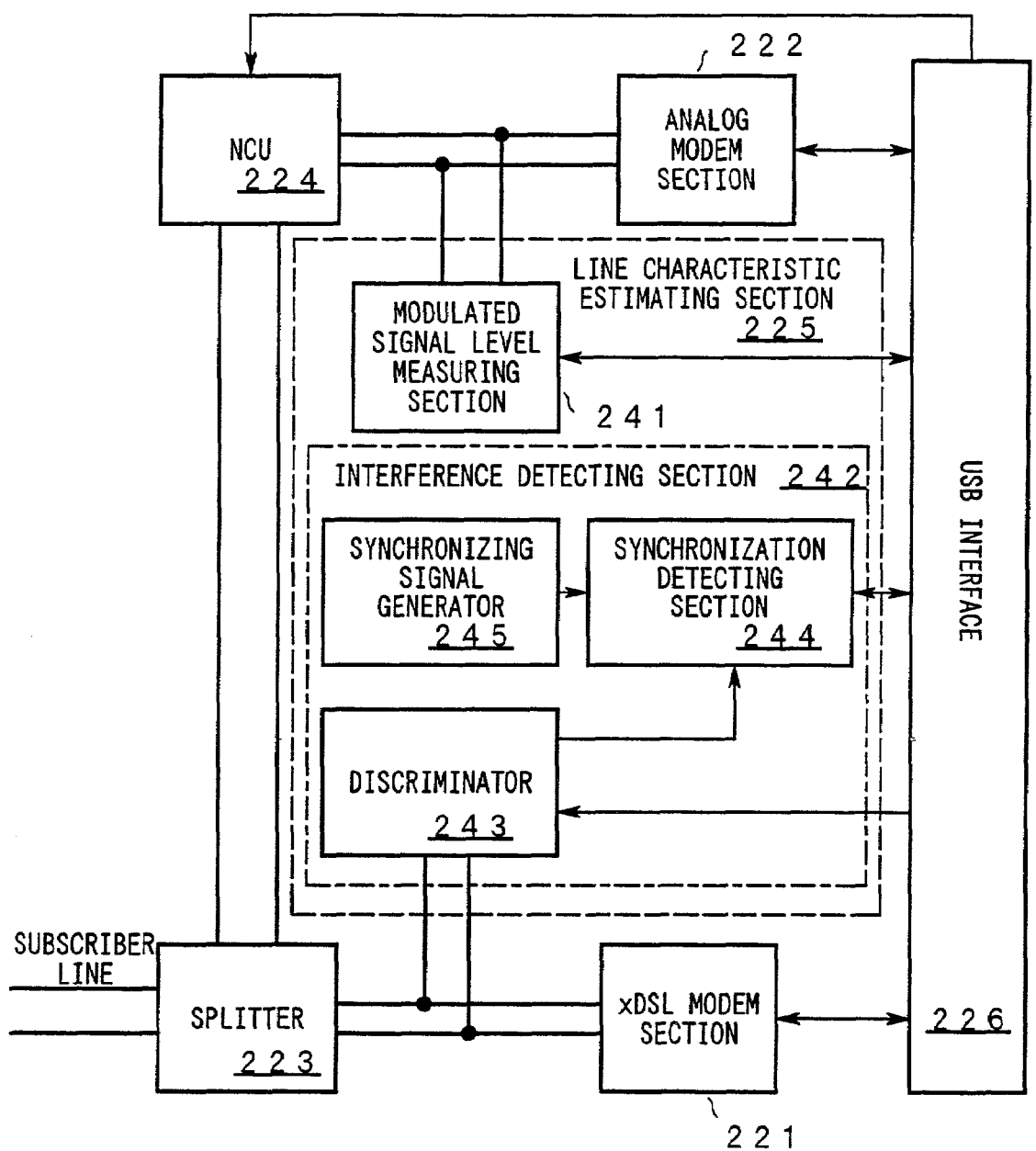
FIG. 4 is a block diagram showing a detailed constitution of the xDSL modem.

A detailed constitution of the line characteristic estimating section 225 is shown in FIG. 4.

In the line characteristic estimating section 225 shown in FIG. 4, in response to the instruction received through the USB interface 226, a modulated signal level measuring section 241 measures a level of a modulated signal received by the analog modem section 222, and informs the measurement result to the personal computer 230 through the USB interface 226. In an interference detecting section 242 shown in FIG. 4, a discriminator 243 monitors a signal having a high frequency band, which is received by the XDSL modem section 221, and when the discriminator 243 detects noises showing a predetermined signal level or more, the discriminator 243 outputs a detection signal to inform the occurrence of the noises to a synchronization detecting section 244. A synchronizing signal generator 245 generates a synchronizing signal of a frequency identical to that of a synchronizing signal used for a data transmission by use of ISDN, and supplies the synchronizing signal to the synchronization detecting section 244. The synchronization detecting section 244, based on the synchronizing signal received from the synchronizing signal generator 245 and the detection signal received from the discriminator 243, examines a relation between a period at which the noises showing the predetermined signal level or more are detected by the discriminator 243 and the synchronizing signal, and the synchronization detecting section 244 informs the result to the personal computer 230 though the USB interface 226.

Here, when the xDSL modem section 221 is applied the above-described Annex. C, an element for generating a synchronizing signal of a frequency of 400 Hz used for a data transmission by use of a time compression multiplexing system in Japanese style ISDN is provided. Accordingly, this element can be utilized as the synchronizing signal generator 245.

A correlation between each of the units and the units shown in FIGS. 1 and 2 and each of the sections shown in FIGS. 3 and 4 will be described below.

The analog transmitting unit 106 shown in FIG. 1 is realized by the NCU 224 and the analog modem section 222 shown in FIG. 3. The xDSL modem section 221 shown in FIG. 3 is equivalent to the digital transmitting unit 105 shown in FIG. 1. On the other hand, a function of the evaluating unit 11 shown in FIG. 1 is realized in such a manner that the line characteristic estimating section 225 provided in the xDSL modem equipment 220 shown in FIG. 3 performs a transferring/receiving of data with the modem controlling section 231 provided in the personal computer 230 through the USB interface. A function of the requiring unit 112 shown in FIG. 1 is realized in such a manner that through the USB interface, in accordance with a procedure to be described later, the measurement controlling section 232 provided in the modem controlling section 231 shown in FIG. 3 requests the analog modem section 222 and the NCU 224 to transmit a predetermined message. Moreover, a function of the analyzing unit 113 shown in FIG. 1 is realized in such a manner that the line characteristic estimating section 225 provided in the xDSL modem equipment 220 shown in FIG. 3 and the characteristic evaluating section 237 provided in the modem controlling section 231 of the personal computer 230 execute their own processings in response to an instruction from the measurement controlling section 232. Still furthermore, a function of the reporting unit 114 shown in FIG. 1 is realized in such a manner that a message made by the reporting section 233 shown in FIG. 3 is transmitted to the xDSL modem equipment 220 through the USB interface, and the analog modem section 222 is requested to transmit the message. The speech signal level measuring unit 123 shown in FIG. 1 is equivalent to the modulated signal level measuring section 241 shown in FIG. 4, and the signal loss calculating unit 122 is equivalent to the characteristic evaluating section 237 shown in FIG. 3. Furthermore, the discriminator shown in FIG. 4 is equivalent to the noise-detecting unit 126 shown in FIG. 2. A function of the periodicity examining unit 127 shown in FIG. 2 is realized by the synchronizing signal generator 245 and the synchronization detecting section 244 shown in FIG. 4.

Note that, the control signal level measuring unit 121 shown in FIG. 1 will be described later.

An operation for measuring the line characteristic will be described in detail below.

Figure 5:
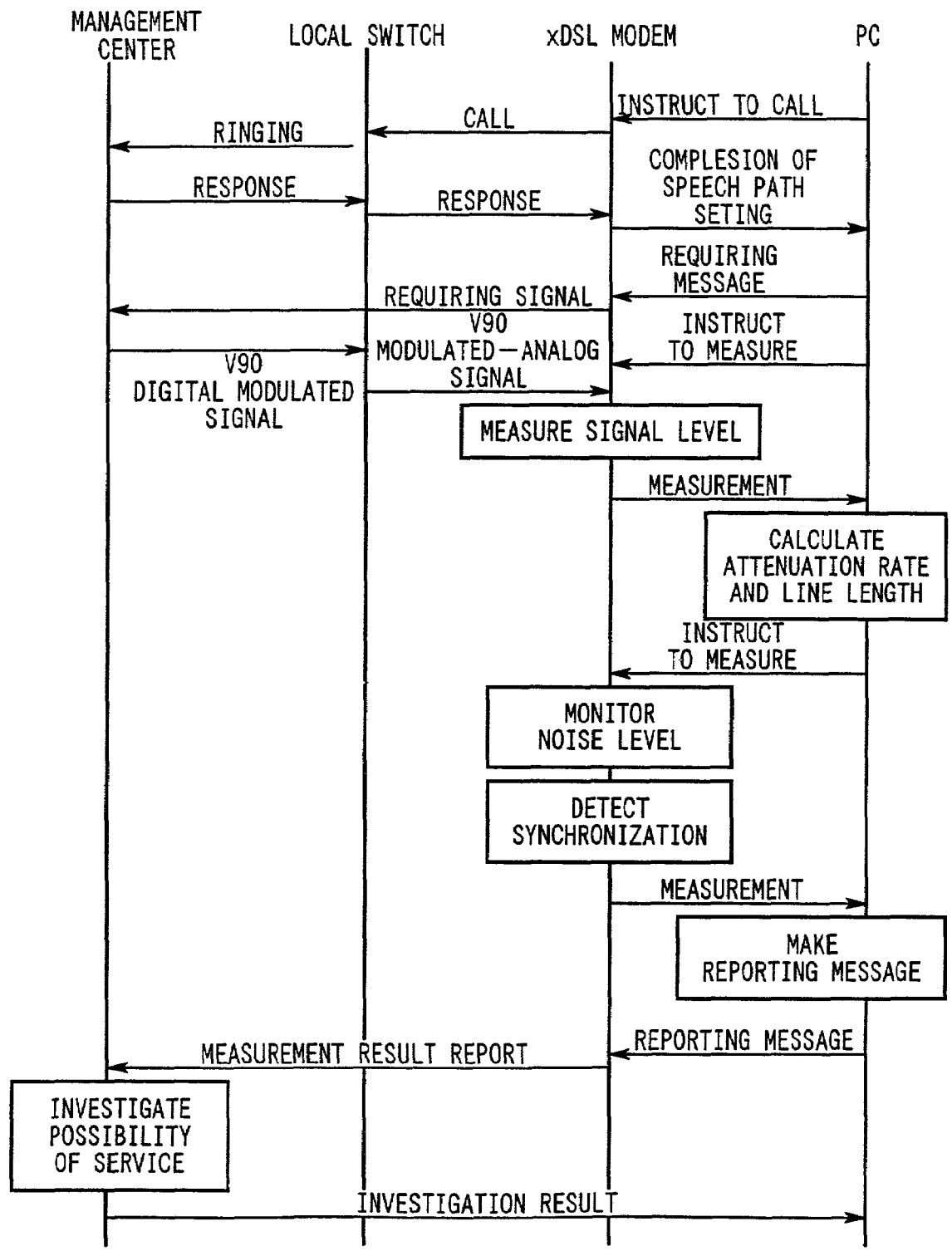
FIG. 5 is a sequence diagram for explaining an operation to measure a line characteristic.

A sequence diagram for explaining the operation for measuring the line characteristic is shown in FIG. 5. A flowchart for illustrating the measurement operation is shown in FIG. 6.

Figure 6:
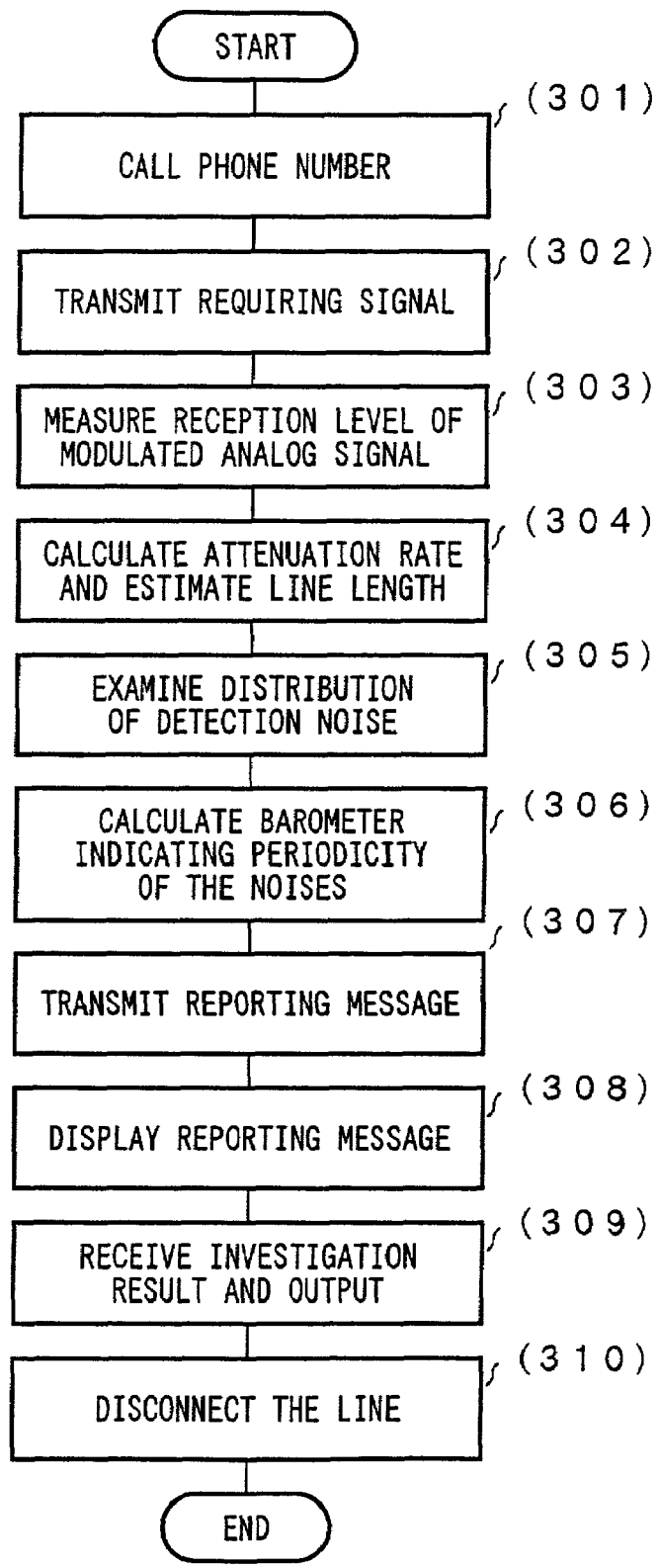
FIG. 6 is a flowchart illustrating the operation to measure the line characteristic.

FIGS. 3 and 4 as well as FIGS. 5 and 6 are referred to in the following descriptions.

For example, when a predetermined measurement start instruction is input to the personal computer 230 shown in FIG. 3 through the input equipment 234 provided therein, the measurement controlling section 232 provided in the modem controlling section 231 delivers through the USB interface a phone number of a management center set up by the provider to the NCU 224 provided in the xDSL modem equipment 220, and instructs the NCU 224 to call this phone number. In response to this instruction to call the phone number, the NCU 224 performs an ordinary call operation, and a speech path is established between the management center and the subscriber (step 301, see FIG. 5).

Here, a transmission path between the xDSL modem equipment 220 provided in the subscriber's home and the local switch is a general subscriber line, that is, a so-called twisted-pair cable formed by twisting two copper wires. On the other hand, when a modulated-analog signal in conformity with the recommendation V.90 by ITU-T is used as a signal for measuring the line characteristic in procedures described later, the transmission path established between the local switch and the management center set up by the provider needs to be a digital line on which a digital signal is transmitted.

After a notification of that the establishment of the speech path is completed as shown in FIG. 5, the measurement controlling section 232 delivers a predetermined signal requiring message to the analog modem section 222 through the USB interface, and instructs the analog modem section 222 to transmit this message to the above-described management center. In response to this instruction, the analog modem section 222 converts the message received from the measurement controlling section 232 to a modulated-analog signal, and sends out the modulated-analog signal to the subscriber line through the NCU 224 and the splitter 223. The modulated-analog signal is transmitted to the management center through the above-described speech path as a requiring signal indicating the above-described signal request message (step 302, see FIGS. 5 and 6).

Furthermore, at this time, the measurement controlling section 232 instructs the modulated signal level measuring section 241 through the USB interface to measure a signal level of the modulated-analog signal input to the analog modem section 222. On the other hand, as a response signal to the above-described requiring signal, a modulated signal obtained by converting predetermined test data in conformity to the regulation of the recommendation V.90 by ITU-T (hereinafter referred to as a digital modulated signal) is sent out from the management center to the transmission path, and the digital modulated signal is converted to a modulated analog signal in the local switch. Thereafter, the modulated analog signal arrives at the analog modem section 222 provided in the xDSL modem equipment 220 through the subscribed line (see FIG. 5).

At this time, the modulated signal level measuring section 241 measures a signal level of the modulated-analog signal input to the analog modem section 222 (step 303), and informs the measurement result to the measurement controlling section 232 through the USB interface (see FIG. 5).

The measurement controlling section 232 delivers the measurement result, which is informed from the modulated signal level measuring section 241, to the characteristic evaluating section 237, and the characteristic evaluating section 237 calculates a characteristic value indicating a line characteristic of the subscriber line in accordance with the measurement result and the reference value based on the spec of the local switch (step 304, see FIG. 5). For example, when an average value $D_{VA}$ of the signal level of the modulated-analog signal received as the measurement result is divided by the reference value $D_{VS}$ based on the spec of the local switch, an attenuation rate can be obtained as a barometer indicating a transmission loss in the subscriber line. In addition, since a correlation between an attenuation rate and a line length is known in a range including a frequency band of the modulated-analog signal as for a general subscriber line, the line length of the subscriber line from the xDSL modem equipment 220 to the local switch can be obtained based on this correlation and the attenuation rate obtained in accordance with the above-described procedures.

Here, the above-described digital modulated signal is transmitted as a digital signal on the transmission path extending from the management center to the local switch connected to the customer's line, and converted to an analog signal in the local switch for the first time. Then, this analog signal is transmitted to the XDSL modem equipment 220 through the subscriber line. Consequently, since the reception level of the modulated-analog signal measured in the above-described manner simply reflects the transmission loss by the subscriber line from the local switch to the xDSL modem equipment 220, it is possible to precisely evaluate the transmission loss by the subscriber line based on the signal level of the modulated-analog signal.

Next, a method of evaluating a characteristic concerning noises leaking to the subscriber line connected to the xDSL modem equipment 220 from other subscriber lines.

For example, after an input of the above-described digital modulated signal is completed, the measurement controlling section 232 instructs, through the USB interface, the discriminator 243 and the synchronization detecting section 244 shown in FIG. 4 to start monitoring of a noise level (see FIG. 5). In response to this instruction, the synchronization detecting section 244, for example, examines how the detection signal received from the discriminator 243 is distributed in one cycle of the synchronizing signal, while changing each of phases of the synchronizing signal received from the synchronizing signal generator 245 (step 305 in FIG. 6). The synchronization detecting section 244 informs the examination result to the measurement controlling section 232 provided in the modem controlling section 231 through the USB interface (see FIG. 5).

The characteristic evaluating section 237 receives the examination result from the measurement controlling section 232. Based on the examination result, the characteristic evaluating section 237, for example, calculates a ratio r of the detection signal distributed in the first half and the second half in one cycle of the synchronizing signal for each of the phases changed in the synchronization detecting section 244 described above. The characteristic evaluating section 237 informs the maximum value Rs of the ratio r to the reporting section 233 as a barometer indicating a synchronization of the synchronizing signal with timings at which noises having a signal power of a predetermined threshold Th or more frequently mix, that is, a barometer indicating a periodicity of the noises (step 306).

Here, when a ISDN line as well as the subscriber line to be measured are accommodated in a unit constituting a telephone cable, it has been known that noises showing a periodic large power, that is, a near-end crosstalk, leak at timings at which upstream data tending from the subscriber of the ISDN line to the local switch is transmitted. Accordingly, by evaluating the periodicity of the noises in conformity to the above-described procedures, it is possible to obtain a barometer for deciding whether or not the ISDN line is accommodated in the unit closely to the subscriber line to be measured.

Next, the reporting section 233 makes a reporting message which includes the measurement value of the attenuation rate obtained in the step 304, the estimation value of the line length, and the evaluation value indicating the foregoing periodicity of the noises, and delivers the reporting message to the analog modem section 222 through the USB interface to request the analog modem section 222 to transmit the reporting message to the management center (see FIG. 5). In response to this request, this message is converted to an modulated-analog signal by the analog modem section 222, and informed to the management center via the speech path established between the management center and the analog modem section 222 (step 307 in FIG. 6). Note that, this modulated-analog signal is indicated as a measurement result report in FIG. 5.

Furthermore, the reporting section 233 requests the display controlling section 238 shown in FIG. 3 to display the reporting message; and in response to this request, the display controlling section 238 allows the display device 239 to display the reporting message thereon (step 308). Thus, information relative to the line characteristic obtained for the subscriber line to be measured can be provided to the user.

On the other hand, the management center that has received the above-described reporting message estimates a service quality that can be expected when the subscriber line is used, based on each data included in the reporting message. Based on the estimation result, the management center investigate a possibility of the broadband communication service by the use of the xDSL system, a required countermeasure, and a range of the service that can be provided.

Moreover, the investigation result obtained in the above-described manner is transmitted to the xDSL modem equipment 220 through the above-described speech path, and received by the analog modem section 222. Thereafter, the investigation result is informed to the modem controlling section 231 (see FIG. 5 and step 309 in FIG. 6).

In response to the receipt of the investigation result, when the modem controlling section 231 delivers the investigation result informed thereto to the input/output controlling section 235 and then instructs the input/output controlling section 235 to output the investigation result (step 309 in FIG. 6), it is possible to provide the investigation result to the user.

Thereafter, the modem controlling section 231 instructs the NCU 224 provided in the xDSL modem equipment 220 through the USB interface to disconnect the line (step 310), and thus the processing is finished.

In the above-described manner, prior to the start of the management for the broadband communication service by use of the xDSL system, it is possible to examine whether or not it is serviceable as described above by the provider of the broadband communication service, based on the reliable measurement result. Thus, personal expenses and the like, which occur owing to sending of a maintenance worker for measuring a line characteristic, can be made unnecessary. Accordingly, when the provider sets up the services, it is possible to drastically reduce a risk born by the provider for providing the broadband communication service by use of the xDSL scheme.

Since the provider can precisely estimate, based on the line characteristic obtained as described above, the service quality that the provider can offer, it is possible for the provider to exactly judge a necessary countermeasure and a range of the service that the provider can offer and also to offer services coping with individual customers with careful attention.

As a transmission characteristic of the above-described line, for example, when data indicating a large transmission loss is obtained, as a countermeasure for offering the service, it is possible to decide without fail that a connection of the subscriber line must be changed from a subscriber line showing a much transmission loss to that showing a least transmission loss. Moreover, if a cyclic noise due to the near-end crosstalk from the ISDN equipment is a main cause to deteriorate the service quality, a proposal from the provider to the customer is conceived, which tells that a technology to avoid influences of the cyclic noise (see the recommendation Annex. C of G. lite and G. dmt that is an international standard spec as to the ADSL system by ITU-T) will be applied, and a service with a communication speed, for example, limited up to 500 kbps will be provided.

Thus, it is possible to diversify kinds of services that can be provided by the provider as well as to enable the customers to have a wide selection of services, leading to an improvement of a provision of services for the customer on the whole.

Prior to a contract for the service provision, sufficient information can be transmitted from the provider to the customer by transmitting to the xDSL modem equipment 220 of the customer a proposal fitting to a customer's environment and costs accompanied with the proposal in addition to an investigation result report including the foregoing investigation result. Accordingly, troubles relating to the contract can be prevented beforehand.

Next, another embodiment of the xDSL modem according to the present invention will be described.

Figure 7:
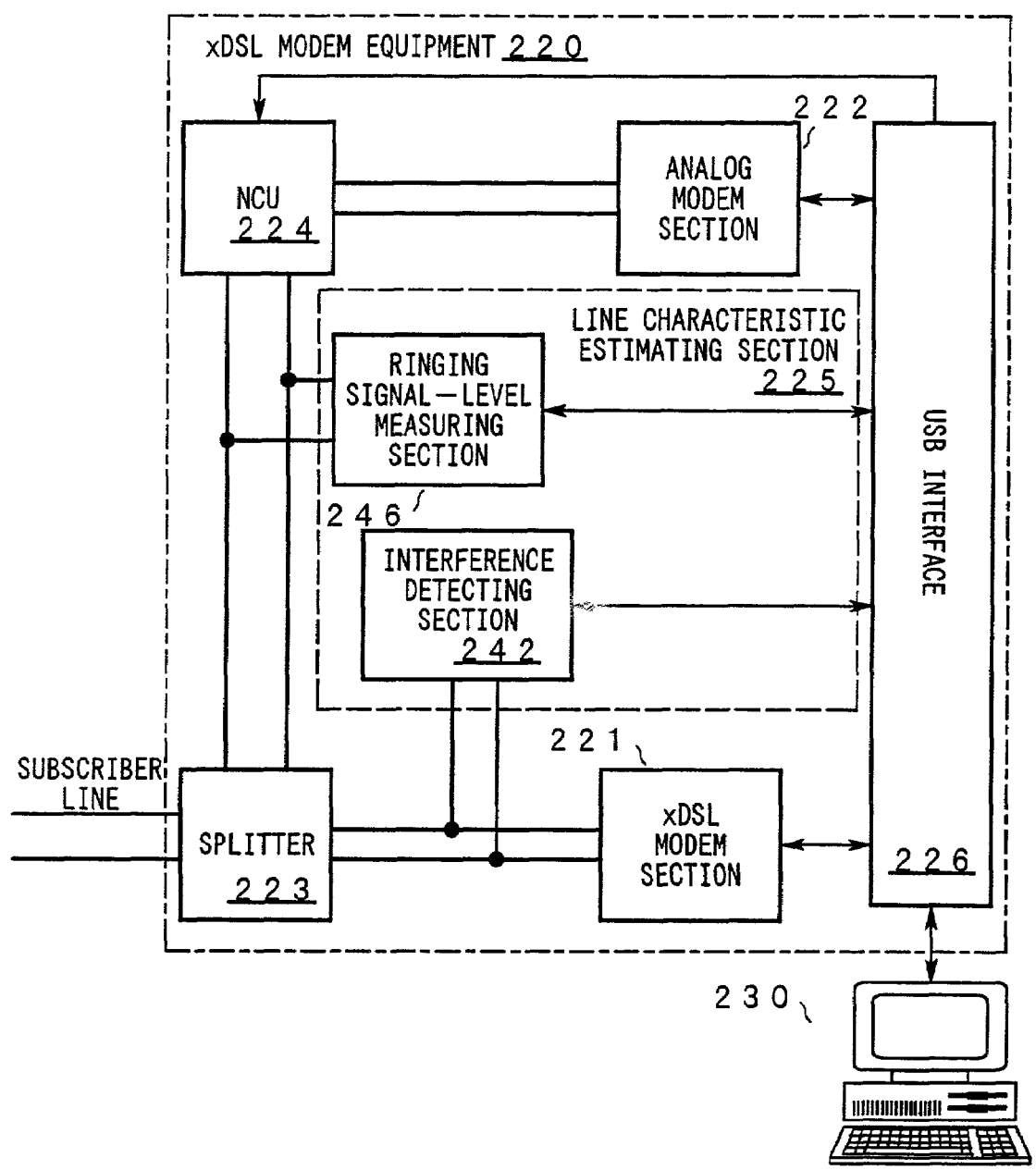
FIG. 7 is a block diagram showing a second embodiment of the xDSL modem according to the present invention.

A second embodiment of the xDSL modem according to the present invention is shown in FIG. 7.

In the xDSL modem equipment 220 shown in FIG. 7, the constituent components shown in FIG. 7, which are equivalent to those shown in FIGS. 3 and 4, are denoted by the same reference numerals, and descriptions for them are omitted.

The line characteristic estimating section 225 provided in the xDSL modem equipment 220 shown in FIG. 7 comprises a ringing signal-level measuring section 246 in stead of the modulated signal level measuring section 241 shown in FIG. 4.

The ringing signal-level measuring section 246 is equivalent to the control signal level measuring unit 121 shown in FIG. 1. In response to an instruction received via the USB interface 226, the ringing signal-level measuring section 246 measures a reception level of a ringing signal, when the ringing signal is input to the NCU 224. The ringing signal is the one which is a signaling signal sent out from the local switch to the subscriber line on the signal receipt side, and the ringing signal is obtained by modulating a predetermined voltage value $Vr_0$ (AC75V) with 16 Hz. Then, the ringing signal-level measuring section 246 sends out the measurement result to the modem controlling section 231 provided in the personal computer 230 through the USB interface 226.

In this case, after the measurement controlling section 232 provided in the modem controlling section 231 transmits a requiring signal in the same manner as step 302 shown in FIG. 6, the measurement controlling section 232 instructs the NCU 224 through the USB interface to cut the line, and then the line is once cut off. Thereafter, the measurement controlling section 232 instructs the ringing signal-level measuring section 246 through the USB interface to measure the reception level of the ringing signal, and the measurement controlling section 232 waits the arrival of the ringing signal. In this case, the measurement controlling section 232 transmits a requiring signal including a telephone number of the customer; and in response to this requiring signal, the management center performs a calling operation for designating the telephone number shown in the requiring signal, in stead of an operation to transmit the V. 90 digital modulated signal shown in FIG. 5. Accordingly, the management center allows the local switch to generate the ringing signal, and the local switch sends out the ringing signal onto the subscriber line connected to the customer's home.

Here, an amplitude of the ringing signal sent out from the local switch onto the subscriber line is very strictly defined. Therefore, procedures for measuring the reception level Dr of the ringing signal are executed in stead of step 302 shown in FIG. 6; and, in stead of the step 303, procedures for estimating the line length of the subscriber line are executed based on an attenuation rate of the ringing signal obtained by dividing the reception level Dr by the foregoing reference voltage value $Vr_0$. Thus, the line length of the subscriber line can be very precisely estimated.

Figure 8:
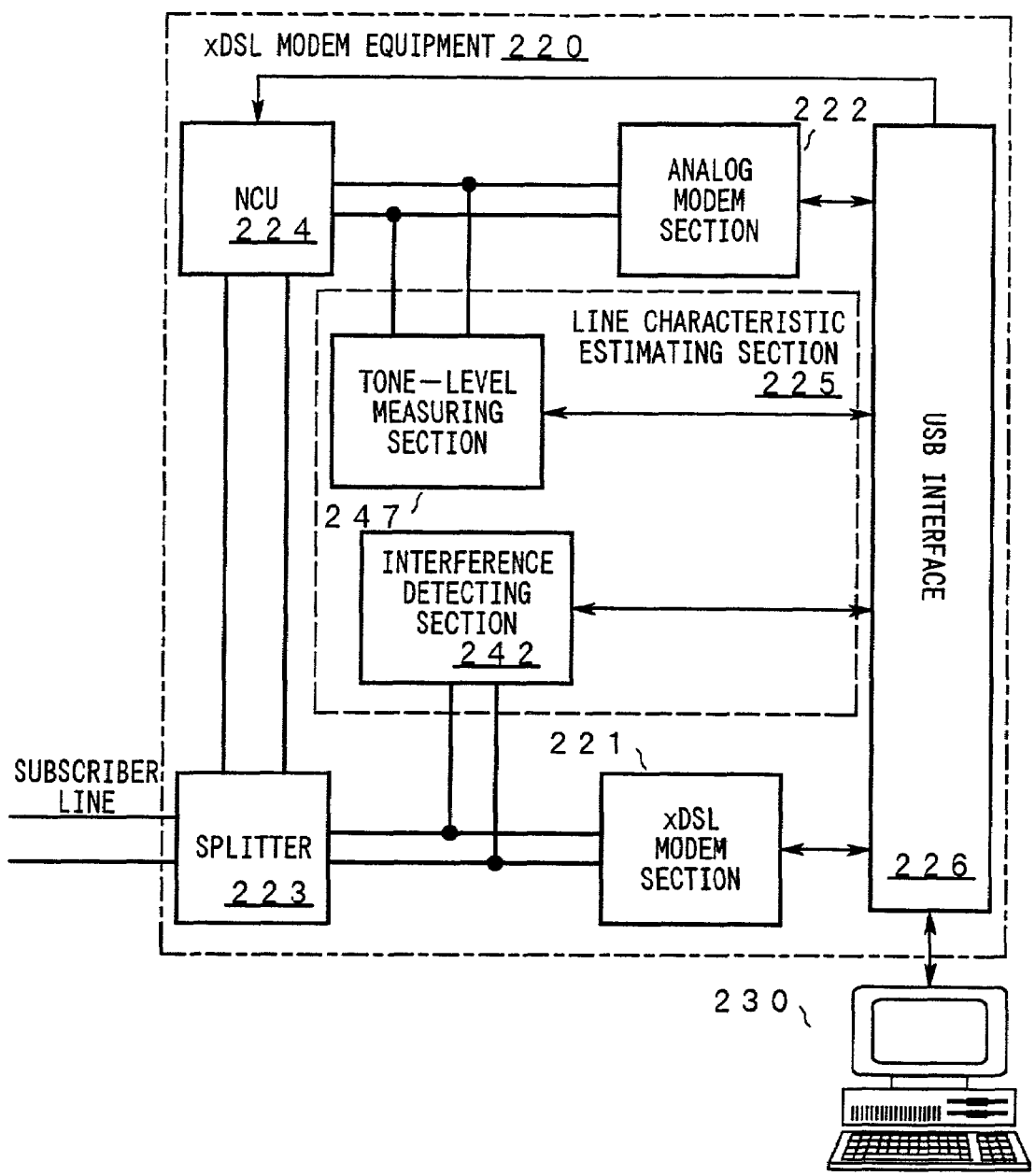
FIG. 8 is a block diagram showing a third embodiment of the xDSL modem according to the present invention.

A third embodiment of the xDSL modem according to the present invention is shown in FIG. 8.

In the xDSL modem equipment 220 shown in FIG. 8, the constituent components shown in FIG. 8, which are equivalent to those shown in FIGS. 3 and 4, are denoted by the same reference numerals, and descriptions for them are omitted.

The line characteristic estimating section 225 provided in the xDSL modem equipment 220 shown in FIG. 8 comprises a tone-level measuring section 247 in stead of the modulated signal level measuring section 241 shown in FIG. 4.

The tone-level measuring section 247 is equivalent to the control signal level measuring unit 121 shown in FIG. 1. In response to an instruction received through the USB interface 226, the tone-level measuring section 247 measures a reception level of a secondary dial tone when the secondary dial tone is input to the analog modem section 222. The secondary dial tone is a register signal sent out from the local switch to the subscriber line on the signal receipt side for designating an extension number and the like, and the secondary dial tone is obtained by modulating a predetermined voltage value $Vt_0$ with a predetermined frequency, for example, 400 Hz. The measurement result obtained by the tone-level measuring section 247 is sent out to the modem controlling section 231 provided in the personal computer 230 through the USB interface 226.

In this case, in response to the requiring signal, in stead of the V.90 digital modulated signal shown in FIG. 5, a digital control signal indicating a predetermined extension number is sent out by the management center to the speech path. Based on the digital control signal, the secondary dial tone indicating this extension number is generated by the local switch, and sent out to the subscriber line.

Similarly to the foregoing ringing signal, an amplitude of the secondary dial tone sent out to the subscriber line from the local switch is very strictly defined. Accordingly, procedures for measuring the reception level Dt of the secondary dial tone are executed in stead of step 302 shown in FIG. 6; and procedures for estimating the line length of the subscriber line are executed based on the attenuation rate of the secondary dial tone obtained by dividing the reception level Dt by the foregoing reference voltage value Vdt. Thus, the line length of the subscriber line to be measured can be very precisely estimated.

As the control signal measured by the control signal level measuring unit 121 shown in FIG. 1, a signal having an amplitude defined very strictly when it is sent out from the local switch to the subscriber line can be used, besides the ringing signal and the secondary dial tone.

Figure 9:
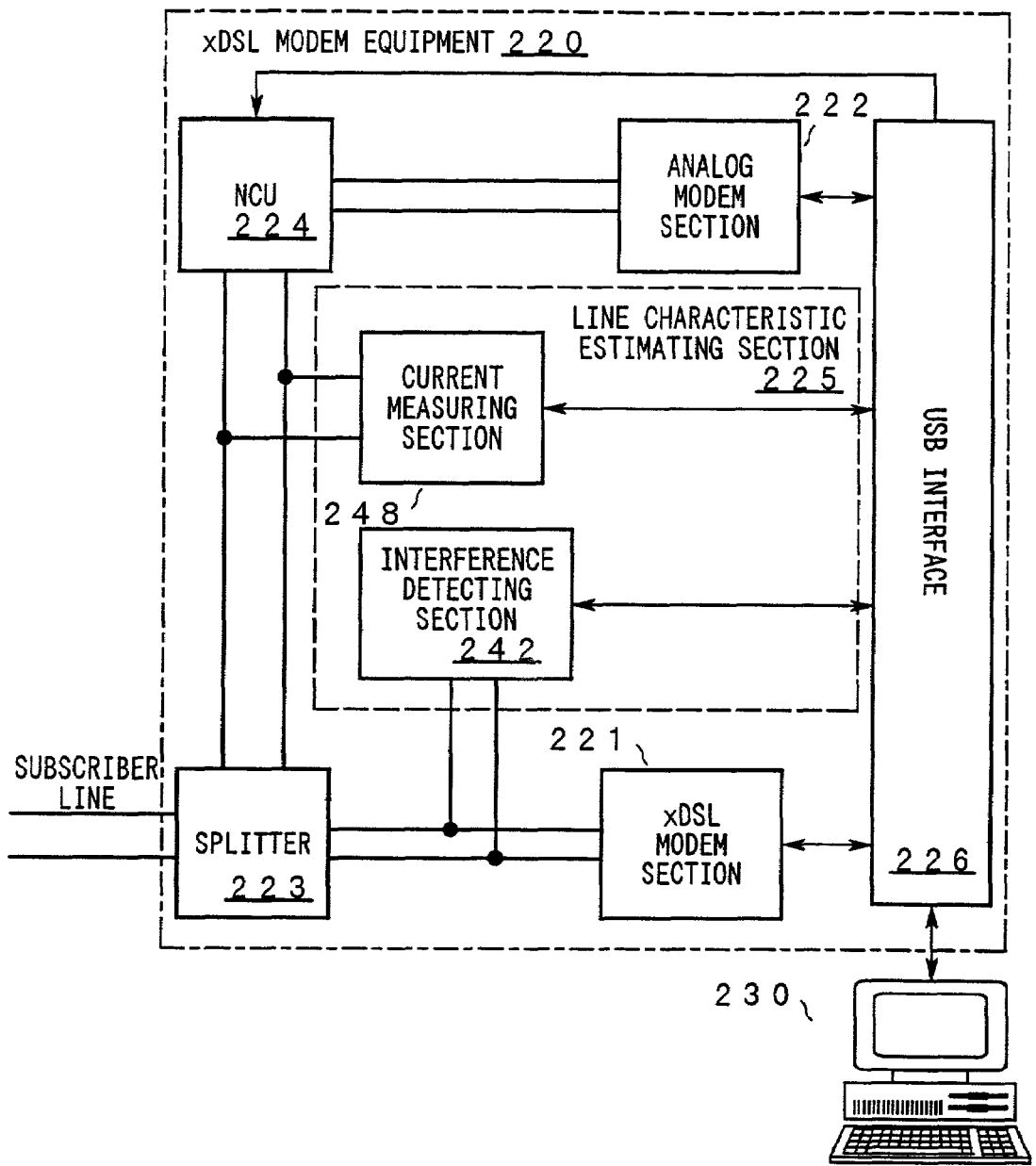
FIG. 9 is a block diagram showing a fourth embodiment of the xDSL modem according to the present invention.
Figure 10:
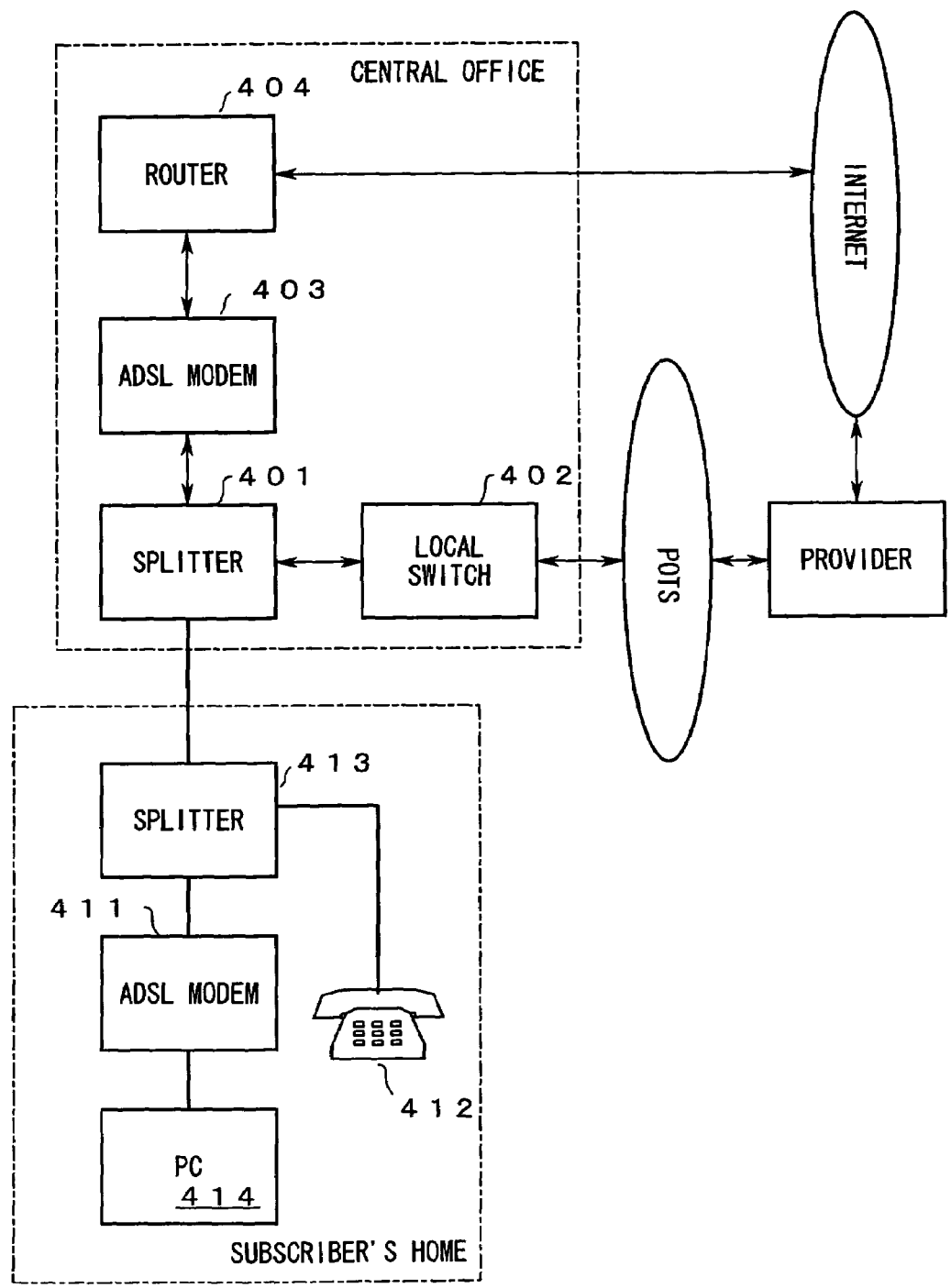
FIG. 10 is a block diagram showing a constitution example of a communication system for providing a broadband communication service by ADSL.

A fourth embodiment of the xDSL modem according to the present invention is shown in FIG. 9.

In the xDSL modem equipment 220 shown in FIG. 9, the constituent components shown in FIG. 9, which are equivalent to those shown in FIGS. 3 and 4, are denoted by the same reference numerals, and descriptions for them are omitted.

The line characteristic estimating section 225 provided in the xDSL modem equipment 220 shown in FIG. 9 comprises a current measuring section 248 in stead of the modulated signal level measuring section 241 shown in FIG. 4.

In response to an instruction received through the USB interface 226, the current measuring section 248 measures a line current, that is, a DC current flowing through a circuit including a constant voltage power source provided in the local switch and a customer premises equipment such as a telephone set and a subscriber line, when a hand set is made to be in an off-hook state. The current measuring section 248 sends out the measurement result to the modem controlling section 231 provided in the personal computer 230 through the USB interface 226.

In this case, the measurement controlling section 232 (see FIG. 3) provided in the modem controlling section 231 instructs the NCU 224 to produce the off-hook state, and, at the same time, instructs the current measuring section 248 to measure a line current value.

A spec of the constant voltage power source Vs provided in the local switch and a resistivity value of a resistor used for the termination resistance of the subscriber line are very strictly defined; and a relation between a transmission distance in a general subscriber line and a value of the line current is known. Accordingly, procedures for measuring the line current value $I_c$ are executed in stead of step 302 shown in FIG. 6; and procedures are executed in stead of step 303, in which the characteristic evaluating section 237 calculates an attenuation rate by dividing a voltage drop $V_c$ by the power source voltage $V_s$, the voltage drop $V_c$ being obtained based on the line current value $I_c$ and the termination resistance Rt used for the terminal, and estimates the line length of the subscriber line based on this attenuation rate. Thus, it is possible to very precisely estimate the line length of the subscriber line to be measured.

As described above, in response to the instruction input to the measurement controlling section 232 through the USB interface 226, the NCU 224 produces the off-hook state and the current measuring section 248 measures the value of the line current, whereby a function of the current/voltage measuring unit 124 shown in FIG. 2 is realized. Based on the value of the line current measured by the current measuring section 248, the characteristic evaluating section 237 calculates the attenuation rate in conformity to the foregoing procedures, thus realizing a function of the current loss calculating unit 125 shown in FIG. 2.

The voltage drop $V_c$ due to a flow of the line current through the termination resistor of the subscriber line may be directly measured in such a manner that the line characteristic estimating section 225 is constituted by comprising a voltage measuring section 249 in stead of the current measuring section shown in FIG. 9, and a voltage difference generated between the two copper wires forming the subscriber line is measured in stead of the line current value as described above. Also when such a constitution is adopted, the line length of the subscriber line to which the service is to be provided can be very precisely estimated based on the voltage drop $V_c$ by executing the procedures for estimating the line length of the subscriber line.

The invention is not limited to the above embodiments and various modifications may be made without departing from the spirit and scope of the invention. Any improvement may be made in part or all of the components.

What is claimed is:

1. An xDSL modem used for digital communication through a subscriber line connecting a local switch and a customer premises equipment, and which includes a digital transmitting unit for performing the digital communication using a data signal, the data signal being separated by a splitter from an analog control signal and a speech signal used for a telephone communication by use of an analog transmitting unit, the xDSL modem comprising:
    an evaluating unit for evaluating, prior to a start of a provision of a broadband communication service, a transmission characteristic of said subscriber line based on an influence deriving from the transmission characteristic of the subscriber line appearing by a reception result of a signal transmitted from said local switch through said subscriber line; and
    a reporting unit for sending out said transmission characteristic obtained by said evaluating unit to a network through said analog transmitting unit
    wherein said evaluating unit includes:
    a requiring unit for sending out a predetermined requiring signal to the network through the analog transmitting unit; and
    an analyzing unit for analyzing the influence deriving from the transmission characteristic of the submission line appearing in a reception result of an analog signal according to receipt of a response signal sent back from a provider offering a broadband communication service in response to said requiring signal, the analog signal being generated by said local switch directly connected to said xDSL modem and being transmitted trough said subscriber line, and for obtaining an evaluation barometer indicating said transmission characteristic of said subscriber line,
    and wherein said analyzing unit includes:
    a level measuring unit for measuring a reception level of one of a secondary dial tone and a ringing signal which are transmitted from said local switch; and
    a signal loss calculating unit for calculating a transmission loss by a subscriber line between the local switch and the customer premises equipment based on said reception level, and for outputting the transmission loss as a barometer for evaluating said transmission characteristic of said subscriber line.

2. An xDSL modem used for digital communication through a subscriber line connecting a local switch and a customer premises equipment, and which includes a digital transmitting unit for performing the digital communication using a data signal, the data signal being separated by a splitter from an analog control signal and a speech signal used for a telephone communication by use of an analog transmitting unit, the xDSL modem comprising:
    an evaluating unit for evaluating, prior to a start of a provision of a broadband communication service, a transmission characteristic of said subscriber line based on an influence deriving from the transmission characteristic of the subscriber line appearing by a reception result of a signal transmitted from said local switch through said subscriber line; and
    a reporting unit for sending out said transmission characteristic obtained by said evaluating unit to a network through said analog transmitting unit
    wherein said evaluating unit includes:
    a requiring unit for sending out a predetermined requiring signal to the network through the analog transmitting unit; and
    an analyzing unit for analyzing the influence deriving from the transmission characteristic of the submission line appearing in a reception result of an analog signal according to receipt of a response signal sent back from a provider offering a broadband communication service in response to said requiring signal, the analog signal being generated by said local switch directly connected to said xDSL modem and being transmitted through said subscriber line, and for obtaining an evaluation barometer indicating said transmission characteristic of said subscriber line,
    and wherein said analyzing unit includes:
    a signal level measuring unit for measuring a reception level of a modulated-analog signal transmitted from the local switch in response to a predetermined modulated signal in conformity with a recommendation V. 90 by ITU-T; and
    a signal loss calculating unit for calculating a transmission loss by said subscriber line between the local switch and the xDSL modem based on said reception level, and for outputting the transmission loss as a barometer for evaluating said line characteristic of said subscriber line.

3. An xDSL modem used for digital communication through a subscriber line connecting local switch and a customer premises equipment, and which includes a digital transmitting unit for performing the digital communication using a data signal, the data signal being separated by a splitter from an analog control signal and a speech signal used for a telephone communication by use of an analog transmitting unit, the xDSL modem comprising:
    an evaluating unit for evaluating, prior to a start of a provision of a broadband communication service, a transmission characteristic of said subscriber line based on a reception result of a signal transmitted from said local switch through said subscriber line, said evaluating unit comprising:

a current/voltage measuring unit for measuring one of a line current and a voltage, the line current flowing through a subscriber line between the local switch and the xDSL modem in an off-hook state and the voltage between two copper wires forming said subscriber line in a state where said line current flows therethrough; and a current loss calculating unit for calculating a transmission loss by said subscriber line based on one of an obtained value of the line current and an obtained value of the voltage, and for outputting the transmission loss as a barometer for evaluating said transmission characteristic of said subscriber line, and a reporting unit for sending out said transmission characteristic obtained by said evaluating unit to a network through said analog transmitting unit.

4. An xDSL modem used for digital communication through a subscriber line connecting a local switch and a customer premises equipment, and which includes a digital transmitting unit for performing the digital communication using a data signal, the data signal being separated by a splitter from an analog control signal and a speech signal used for a telephone communication by use of an analog transmitting unit, the xDSL modem comprising:

an evaluating unit for evaluating, prior to a start of a provision of a broadband communication service, a transmission characteristic of said subscriber line based on an influence deriving from the transmission characteristic of the subscriber line appearing by a reception result of a signal transmitted from said local switch through said subscriber line; and a reporting unit for sending out said transmission characteristic obtained by said evaluating unit to a network through said analog transmitting unit wherein said evaluating unit includes:

a noise detecting unit for detecting noises having a reception level of a predetermined threshold value or more, from a signal witch is input to the digital transmitting unit provided in the xDSL modem, the signal being separated from an analog signal by the splitter; and a periodicity examining unit for examining a periodicity of the noises detected by said noise-detecting unit and for outputting an obtained examination result as a barometer for evaluating the transmission characteristic of said subscriber line.

* * * * *